No. 770,783. PATENTED SEPT. 27, 1904.
E. H. STEEDMAN.
VALVE FOR AIR COMPRESSORS.
APPLICATION FILED NOV. 2, 1903.
NO MODEL. 2 SHEETS—SHEET 1.
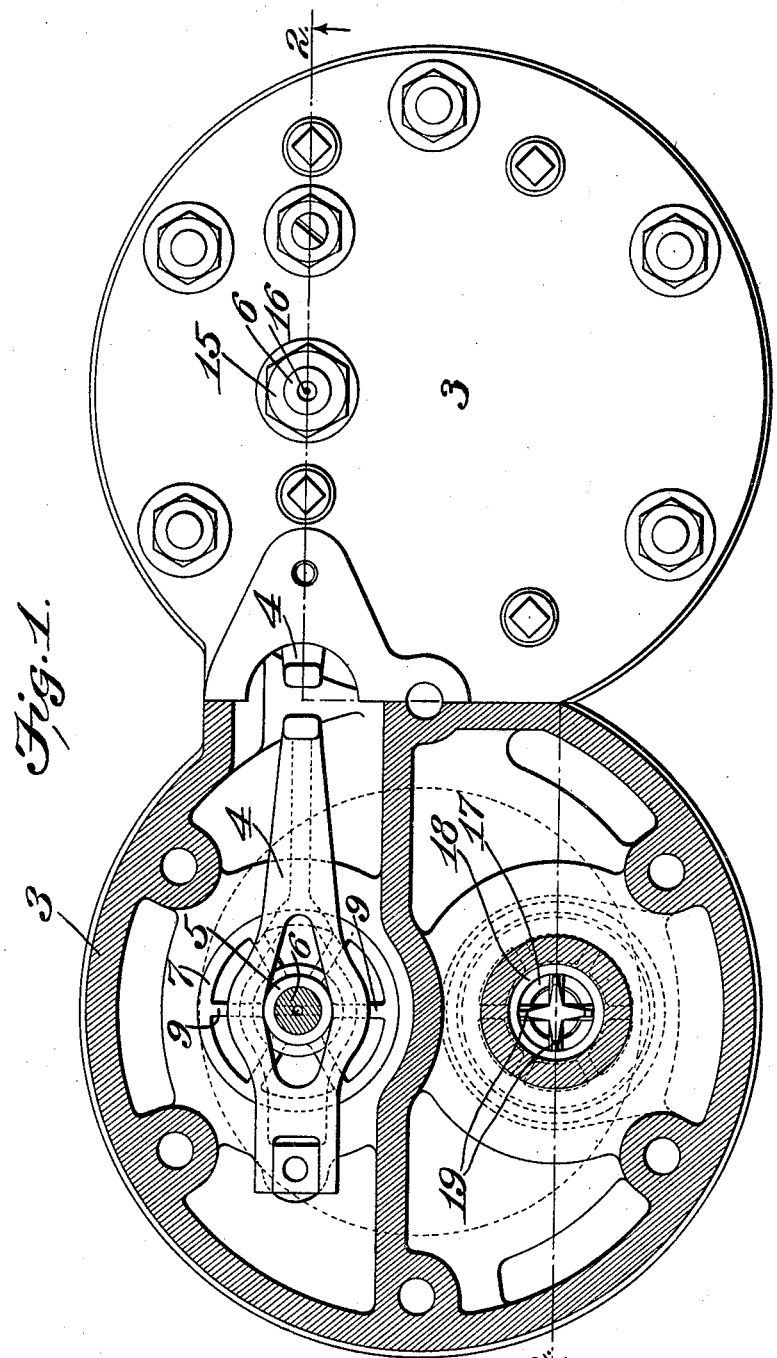
Witnesses:
G. A. Pennington
W. H. Scott
Inventor:
Edwin H. Steedman,
by Bakewell Cornwall
Attys

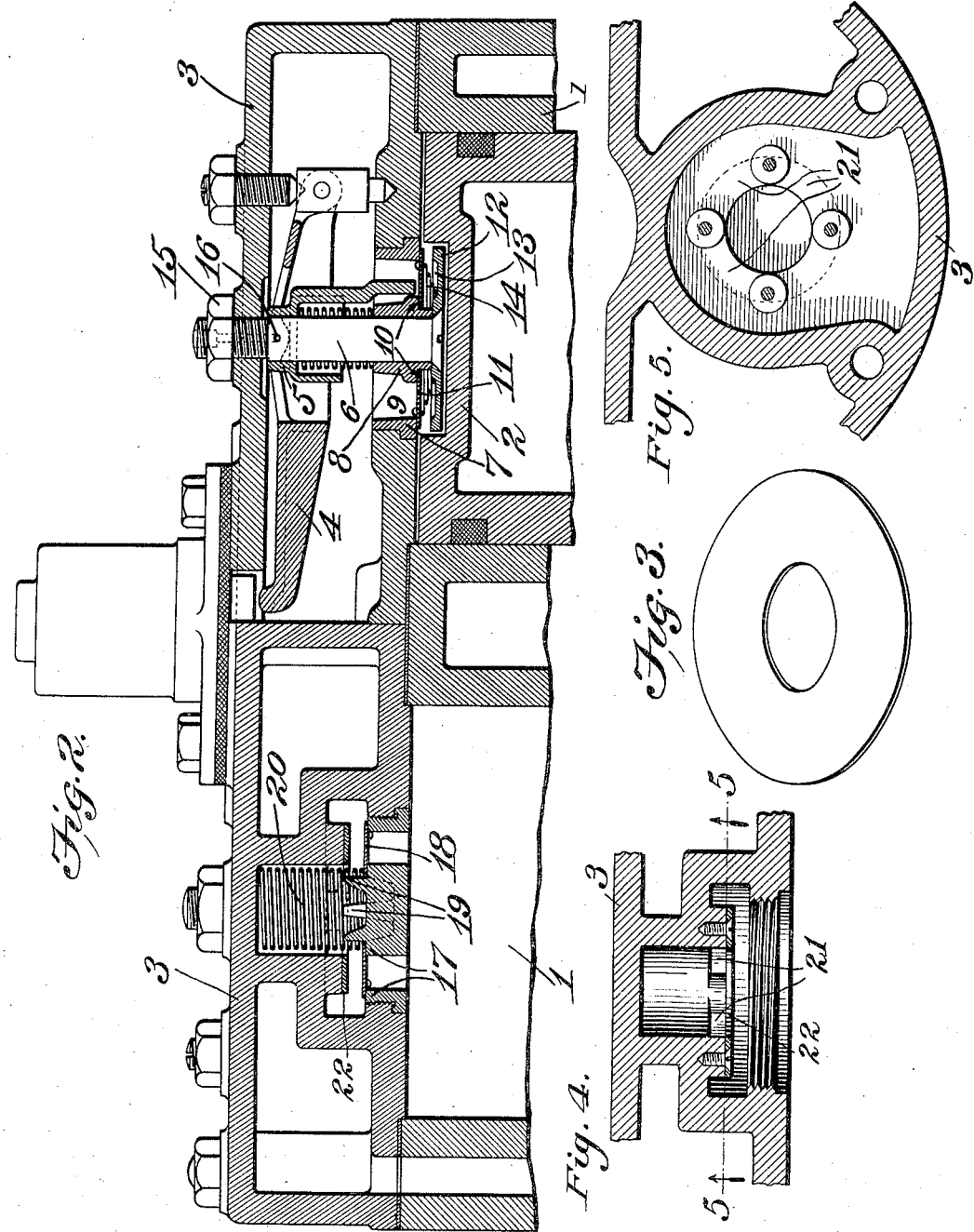

No. 770,783. Patented September 27, 1904.

UNITED STATES PATENT OFFICE.

EDWIN H. STEEDMAN, OF ST. LOUIS, MISSOURI.

VALVE FOR AIR-COMPRESSORS.

SPECIFICATION forming part of Letters Patent No. 770,783, dated September 27, 1904.

Application filed November 2, 1903. Serial No. 179,597. (No model.)

*To all whom it may concern:*

Be it known that I, EDWIN H. STEEDMAN, a citizen of the United States, residing in the city of St. Louis, State of Missouri, have invented a certain new and useful Improvement in Valves for Air-Compressors, of which the following is a full, clear, and exact description, such as will enable others skilled in the art to which it appertains to make and use the same, reference being had to the accompanying drawings, forming part of this specification, in which—

Figure 1 is a top plan view, partly in horizontal section, of an air-compressor, showing my improved valve in position thereon. Fig. 2 is a sectional view on line 2 2 of Fig. 1. Fig. 3 is a detail view of the sheet-metal disk valve. Fig. 4 is a sectional view through a portion of the casing supporting the valve-seat, and Fig. 5 is a sectional view on the line 5 5 of Fig. 4.

This invention relates to a new and useful improvement in valves for air-compressors, the object being to utilize a sheet-metal disk valve, which is a circular disk with flat plain faces, both for the suction and discharge sides of the pump. Sheet-metal valves of the character described are very sensitive in action and are sufficiently pliable to adapt themselves to form a tight joint with the valve-seat, in addition to which sheet-metal valves are light, practically noiseless, and are not liable to hammer themselves out of shape. However, to advantageously use valves of this character it is necessary to provide a support for the valves in their open position, which support acts as a limiting-stop, and said support is designed to contact with the valve practically in the same manner as the valve-seat—to wit, if the valve engages the seat at its inner and outer marginal edges the support also should contact with the valve at its inner and outer edges—so that the pounding action will be equal on both sides of the valve, and in this manner the valve is kept straight and is prevented from sagging or drooping.

With the above object in view the invention consists in the construction, arrangement, and combination of the several parts, all as will hereinafter be described, and afterward pointed out in the claims.

In the drawings, 1 indicates the cylinders of a double-cylinder air-compressor, and 2 the piston.

3 indicates the cylinder-heads, which are hollowed out for the reception of the suction and discharge valves.

4 indicates levers whose ends extend inwardly to coöperate with the fluid-actuated piston for lifting the suction-valve from its seat when the pressure in the reservoir reaches or exceeds a predetermined maximum. This piston is not shown in the drawings, but may be of any suitable design. These levers coöperate with sleeves 5, slidable on the bolt 6, which holds the suction-valve seat in position.

7 indicates the suction-valve seat, which is provided with a hub portion 8 and radially-disposed arms 9, as is well understood. This hub portion is hollowed out and on its exterior has a shoulder 10, ground off flush with the valve-seat for the purpose of supporting the center of the flat disk valve 11. Beneath this shoulder the hub portion extends in the form of a boss, against which fits a spring housing-support 12, said housing-support having a concentric groove 13 in its upper face, in which is seated a helical conical spring 14, which spring may be compressed when the valve is moved outwardly, in which event the valve is supported at its marginal edge, as well as at its center, by the housing-support 12. The groove 13 is preferably of slightly greater depth than the diameter of the spring-wire 14, so that when the valve is in its outer position and arrested by the support 12 the spring-wire 14 is subject to no wear from the valve, and vice versa. The bolt 6 above referred to has its head on its lower end countersunk in the housing-support 12, as shown, the upper end of the bolt being threaded into the outer wall of the cylinder-head and receiving a jam-nut 15 for well-understood purposes. If the suction-valve seat becomes loose, the condition of the nut 15 will indicate this fact. The bolt 6 is provided with an oil-hole 16, leading from the exterior down to a point opposite the sleeve 5, and a lubricating-cup (not shown) is inserted in position to supply oil to this oil-hole. The oil so supplied not only lubricates the sleeve 5 and the disk valve 11, but enters the cylinder and lubricates the piston.

The discharge-valve seat 17 is preferably screwed into the inner wall of the cylinder-head, with which seat coöperates the flat plate valve 18. This valve-seat has guiding-lugs 19 extending upwardly from its central portion to guide the plate valve 18, said plate valve being held to its seat by a spring 20, received in the housing or recess in the outer wall of the cylinder-head. The side walls of this recess are provided with openings 21 in order to accommodate displacement and also to equalize pressure on the valve 18. These openings may be cored in the casting or may be closed by a continuous ring 22, whose area is practically equal to that of the discharge-valve 19 and forms an efficient support for the valve in its open position, so as to prevent the valve from drooping or sagging.

It will be observed that the limiting-stops provided by the head 12 and ring 22 for the suction and discharge valves, respectively, extend over a considerable portion of the area of the valve and offer a solid support for the inner and outer marginal edges of the valves, which contributes materially to the life of the valves in maintaining the same in proper condition at all times to make a tight joint with the valve-seats. It will be noticed also that both the suction and discharge valves are introduced with their seats in position from the cylinder side of the head, and by this is meant from that side of the cylinder-head nearest the cylinder. This is an advantage, as the marginal edge of each of the seats (see Figs. 1, 4, and 5) extends beyond the wall of the cylinder, and in this manner when the head is applied in position the cylinder acts as a lock to prevent the displacement or rotation of the seats. There are no caps or external parts liable to become displaced, and consequently the valve-seats and valves are capable of remaining tight throughout ordinary usage.

I am aware that minor changes in the construction, arrangement, and combination of the several parts of my device may be made and substituted for those herein shown and described without in the least departing from the nature and principle of my invention.

Having thus described my invention, what I claim, and desire to secure by Letters Patent, is—

1. In a valve for air-compressors, the combination with a cylinder-head, of a valve-seat introduced from the cylinder side of said head, and a bolt for securing the same in position, said bolt extending to the exterior and having an opening in its outer end for the introduction of a lubricant; substantially as described.

2. In a suction-valve for air-compressors, the combination with a hollow cylinder-head, of a valve-seat arranged in the inner wall thereof, a bolt for holding said valve-seat in position, said bolt extending through the outer wall of said cylinder-head, the outer end of said bolt being provided with an opening for the introduction of a lubricant; substantially as described.

3. The combination with a hollow cylinder-head, of a valve-seat in the head, and a bolt for securing the valve-seat in position and having a lubricating-opening; substantially as described.

4. The combination with a cylinder-head, of a valve-seat and a valve, and a bolt for securing the two in position and having a lubricating-opening; substantially as described.

5. The combination with a cylinder, a valve-seat and its valve, and a lubricating-bolt for holding the two in the cylinder; substantially as described.

6. The combination with a cylinder, of a valve-carrying bolt supported by the cylinder and having a lubricating-port; substantially as described.

7. The combination with a cylinder, of a bolt carried thereby, a valve-seat in the cylinder through which the bolt projects, and a valve terminally carried by the bolt, said bolt having a lubricating-port; substantially as described.

In testimony whereof I hereunto affix my signature, in the presence of two witnesses, this 26th day of October, 1903.

EDWIN H. STEEDMAN.

Witnesses:
F. R. CORNWALL,
GEORGE BAKEWELL.